US011810098B1

(12) United States Patent
Neale et al.

(10) Patent No.: US 11,810,098 B1
(45) Date of Patent: Nov. 7, 2023

(54) AUGMENTED REALITY NUMBERLESS TRANSACTION CARD (71) Applicant: Wells Fargo, N.A., San Francisco, CA (US)

(72) Inventors: John Ross Neale, Des Moines, IA (US); William R. Breed, Surprise, AZ (US); Jasvir K. Singh, Saint Anthony Village, MN (US); Geraldine M. Carolan, Mesa, AZ (US); Kristine Collings, Charlotte, NC (US); Kourtney Eidam, Marietta, GA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 17/807,546

(22) Filed: Jun. 17, 2022

Related U.S. Application Data (63) Continuation of application No. 16/895,306, filed on Jun. 8, 2020, now Pat. No. 11,397,937, which is a continuation of application No. 15/801,060, filed on Nov. 1, 2017, now Pat. No. 10,713,645, which is a continuation of application No. 15/272,869, filed on Sep. 22, 2016, now Pat. No. 9,836,736, which is a continuation of application No. 14/340,158, filed on Jul. 24, 2014, now Pat. No. 9,477,852.

(51) Int. Cl.
*G06Q 20/32* (2012.01)
*G06Q 20/40* (2012.01)
*G06T 11/00* (2006.01)
*G06F 3/16* (2006.01)
*G06F 3/0488* (2022.01)

(52) U.S. Cl.
CPC ......... *G06Q 20/327* (2013.01); *G06Q 20/409* (2013.01); *G06Q 20/4014* (2013.01); *G06T 11/00* (2013.01); *G06F 3/0488* (2013.01); *G06F 3/16* (2013.01)

(58) Field of Classification Search
CPC ...................................... G06V 20/20
See application file for complete search history.

(56) References Cited

U.S. PATENT DOCUMENTS 5,590,038 A 12/1996 Pitroda
6,715,679 B1 4/2004 Infosino
(Continued)

FOREIGN PATENT DOCUMENTS

WO 2010128451 A2 11/2010
WO 2013120473 A1 8/2013

OTHER PUBLICATIONS

Wallaby Introduces First Financial App for Google Glass with Launch of Pay With Wallaby, PR Newswire, Feb. 12, 2014, 2 pages.
(Continued)

*Primary Examiner* — Thien M Le
*Assistant Examiner* — April A Taylor
(74) *Attorney, Agent, or Firm* — Merchant & Gould P.C.

(57) ABSTRACT

A method implemented on an augmented reality (AR) electronic device includes receiving a request to activate a transaction card account on a transaction card. The transaction card account is activated on the transaction card. A virtual representation of account information corresponding to the transaction card account is displayed on the AR electronic device. The exterior of the transaction card is free of account identifying information.

18 Claims, 7 Drawing Sheets

(56) References Cited

U.S. PATENT DOCUMENTS

| | | | |
|---|---|---|---|
| 6,732,919 | B2 | 5/2004 | Macklin et al. |
| 6,925,439 | B1 | 8/2005 | Pitroda |
| 7,059,520 | B1 | 6/2006 | Shtesl |
| 7,472,829 | B2 | 1/2009 | Brown |
| 7,913,918 | B2 | 3/2011 | Zellner et al. |
| 8,430,310 | B1 | 4/2013 | Ho et al. |
| 3,438,110 | A1 | 5/2013 | Calman et al. |
| 8,447,067 | B2 | 5/2013 | Rhoads et al. |
| 8,547,401 | B2 | 10/2013 | Mallinson et al. |
| 8,577,731 | B1 | 11/2013 | Cope et al. |
| 8,870,081 | B2 | 10/2014 | Olson |
| 9,092,600 | B2 | 7/2015 | Scavezze et al. |
| 9,111,418 | B2 | 8/2015 | Arumugam |
| 9,477,852 | B1 | 10/2016 | Neale et al. |
| 9,679,152 | B1 | 6/2017 | Young et al. |
| 9,883,381 | B1 | 1/2018 | Katzer |
| 2009/0158206 | A1 | 6/2009 | Myllyla |
| 2009/0278660 | A1* | 11/2009 | Beisang ............ H04L 9/3231 340/5.82 |
| 2011/0055049 | A1 | 3/2011 | Harper et al. |
| 2011/0061100 | A1 | 3/2011 | Mattila et al. |
| 2011/0173576 | A1 | 7/2011 | Murphy et al. |
| 2011/0202466 | A1 | 8/2011 | Carter |
| 2011/0202984 | A1 | 8/2011 | Hird et al. |
| 2012/0060226 | A1 | 3/2012 | Park et al. |
| 2012/0074232 | A1 | 3/2012 | Spodak et al. |
| 2012/0115513 | A1 | 5/2012 | Han |
| 2012/0231424 | A1 | 9/2012 | Calman et al. |
| 2012/0231814 | A1 | 9/2012 | Calman et al. |
| 2012/0232937 | A1 | 9/2012 | Calman et al. |
| 2012/0232966 | A1 | 9/2012 | Calman et al. |
| 2012/0232968 | A1 | 9/2012 | Calman et al. |
| 2012/0232976 | A1 | 9/2012 | Calman et al. |
| 2012/0232977 | A1 | 9/2012 | Calman et al. |
| 2012/0233015 | A1 | 9/2012 | Calman et al. |
| 2012/0233032 | A1 | 9/2012 | Calman et al. |
| 2012/0233072 | A1 | 9/2012 | Calman et al. |
| 2012/0286936 | A1 | 11/2012 | Mullen et al. |
| 2012/0290449 | A1 | 11/2012 | Mullen et al. |
| 2012/0323787 | A1 | 12/2012 | Nelsen |
| 2013/0024222 | A1 | 1/2013 | Dunn |
| 2013/0033522 | A1 | 2/2013 | Calman et al. |
| 2013/0042327 | A1 | 2/2013 | Chow |
| 2013/0055356 | A1 | 2/2013 | Gafni |
| 2013/0166441 | A1 | 6/2013 | Kobylkin |
| 2013/0191250 | A1 | 7/2013 | Bradley et al. |
| 2013/0205373 | A1 | 8/2013 | Jaudon et al. |
| 2013/0210523 | A1 | 8/2013 | Arumugam et al. |
| 2013/0218721 | A1 | 8/2013 | Borhan et al. |
| 2013/0268775 | A1 | 10/2013 | Hawkins |
| 2014/0076965 | A1 | 3/2014 | Becorest et al. |
| 2014/0096220 | A1 | 4/2014 | Da Cruz Pinto et al. |
| 2014/0214665 | A1 | 7/2014 | Lee et al. |
| 2014/0237578 | A1 | 8/2014 | Bryant |
| 2015/0073983 | A1 | 3/2015 | Bartenstein |
| 2015/0074800 | A1 | 3/2015 | Farrao |
| 2015/0089607 | A1 | 3/2015 | Hubner et al. |
| 2015/0102907 | A1 | 4/2015 | Hadizad |
| 2015/0287076 | A1 | 10/2015 | Soon-Shiong |
| 2015/0356812 | A1 | 12/2015 | Arumugam et al. |
| 2020/0202313 | A1* | 6/2020 | Eidam ............... A61B 5/117 |

OTHER PUBLICATIONS

Rekimoto et al., "CyberCode: Designing Augmented Reality Environments with Visual Tags," Sony Computer Science Laboratories, Inc., 2000, 10 pages.

Jacqueline Lee, "NXT-ID Announces 'Wocket,' a Mobile Wallet Within a Smart Card," http://www.mobilecommerceinsider.com/topics/mobilecommerceinsider/articles/362470-nxt-id-announces-wocket-mobile-wallet-with-a.htm, Dec. 4, 2013, 3 pages.

Roesner et al., "Security and Privacy for Augmented Reality Systems," Communications of the ACM, vol. 57 No. 4, Apr. 2014, pp. 88-96.

* cited by examiner

AUGMENTED REALITY NUMBERLESS TRANSACTION CARD

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) electronic device, the method comprising: receiving a request to activate a transaction card account on a transaction card; activating the transaction card account on the transaction card; and displaying a virtual representation of account information corresponding to the transaction card account on the AR electronic device, wherein the transaction card is free of account identifying information.

In another aspect, a transaction card comprises: a plastic housing; a wireless communication device; a memory configured to store account information for a plurality of transaction card accounts; one or more electronic components configured to activate one of the transaction card accounts when an activating command for the transaction card account is received at the transaction card; and an account information delivery element configured to deliver data related to the active transaction card account.

In yet another aspect, an augmented reality (AR) device comprises: a processing unit; and system memory, the system memory including instructions which, when executed by the processing unit, cause the AR device to: initiate activation of a transaction card account on a transaction card; obtain identification factors from a person wearing the AR device, the identification factors including at least one biometric identification factor; authenticate the person wearing the AR device based on the obtained identification factors to determine that the wearer of the AR device is authorized to activate the transaction card account on the transaction card and to view transaction card account information on the AR device; after authenticating the person wearing the AR device, activate the transaction card account on the transaction card, the activation of the transaction card comprising sending a wireless signal to the transaction card, the wireless signal including information identifying the transaction card account to be activated; and display a virtual representation of account identifying information corresponding to the activated transaction card account on the AR electronic device, the virtual representation being projected on the transaction card by the AR electronic device, the account identifying information including one or more of an account name, an account number, an expiration date and a card verification value (CVV) for the transaction card account, wherein an exterior of the transaction card is free of the account identifying information.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for using augmented reality (AR) to implement a numberless transaction card. The numberless transaction card is a transaction card that can include a name of a user and also includes a name and typically a logo for a financial institution. However, the numberless transaction card does not have an account number, card verification value (CVV) number, expiration date, or other account identifying information printed or embossed on the transaction card. Instead, the transaction card includes one or more virtual account numbers, CVV numbers and/or expiration dates stored on the numberless transaction card. The virtual account numbers, CVV numbers and/or expiration dates on the numberless transaction card corresponds to actual transaction card accounts, but are only viewable through an AR electronic device of an authorized user. In some embodiments, the account information is displayed on the numberless transaction card when viewing the numberless transaction card through the AR electronic device.

By using virtual accounts rather than having account numbers, CVV numbers and/or expiration dates printed, embossed or otherwise displayed on the transaction card, security of the transaction card is enhanced. The account number, CVV number and/or expiration date for an active account on the transaction card may only be viewed by an authorized user via the AR device. As discussed later herein, the authorized user is identified as being a person configured to be associated with the AR device. A person without an AR device, using another AR device, and/or using the specific AR device without being properly authenticated is not able to view the account number, CVV number and/or expiration date.

If an account for the transaction card becomes comprised, for example through unauthorized use, the financial institution can alert the user of the transaction card about the compromised account and issue a replacement account number and CVV number for the same transaction card, without needing to physically issue another transaction card to the user. Also, the financial institution can remotely renew an expiring transaction card without needing to issue another transaction card to the user.

The replacement transaction card information can be transmitted from the user's AR device to the transaction card, for example, to update the account information stored on the transaction card. In some embodiments, when the transaction card is compromised, an alert is virtually displayed, for example via a pop-up window, on the transaction card when viewed through the AR device. The alert lets the user know that the account number has been remotely changed or is in the process of being changed. A contact number or link may be included as well to provide access to an additional explanation and/or assistance. A second alert may also be sent via text message or email.

In addition, because one transaction card may be associated with a plurality of account numbers, the one transaction card may be used in place of separate transaction cards for each account. This reduces a cost and inconvenience of carrying and using multiple transaction cards.

As used in this disclosure, a numberless transaction card is a transaction card that does not have account identifying information such as an account number, CVV code or expiration date printed or embossed on the transaction card. However, the numberless transaction card may include other numbers, such as an address of a financial institution. In addition, the account number may include characters as well as numbers.

As used in this disclosure, a transaction card is a credit card, a debit card, a loyalty card, a rewards card, a gift card or other similar type cards. Using the systems and methods, the numberless transaction card may be used as a credit card, a debit card, a loyalty card, a rewards card or a gift card or may be used as a credit card, a debit card, a loyalty card, a rewards card or a gift card for a plurality of accounts, as explained in more detail later herein.

The systems and methods are generally described for an AR device that may be worn or carried by a user. An example of and AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print scan capability, and/or voice print analysis capability. The optical display reflects projected images and also permits the user to see through the display.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, CA.

In order to ensure that account information is only displayed to an authorized user, the user needs to be identified. Once identified the account information may be viewed by the user on the AR device. The user of the AR device can be identified using one or more biometric identification methods including facial recognition, retinal scan, finger print scan or voice print analysis. Other methods for identifying the user may be used.

Using the systems and methods of the present disclosure, information related to transaction card accounts can be entered into a digital dashboard. The digital dashboard is a user interface of a computing device, for example a financial services software application accessible from a smart telephone or tablet computer. As explained in more detail later herein, a user may enter account information for one or more transaction card accounts. The transaction card accounts can be linked to the numberless transaction card in other ways, such as be scanning an actual transaction card with the AR device and converting the information on the scanned payment card to virtual account information. In some implementations, the user may also enter authentication information, such as a voice print, retinal scan, finger print scan and facial information. The user can also authorize a specific AR device for use with the transaction card accounts.

Using the systems and methods, the user may be able to activate an account number on the transaction card via one or several ways. One way in which an account number may be activated is with a verbal command. For example, if the transaction card is configured for one credit card and one debit card, the user may simply issue a verbal command such as "credit card" or "debit card" to switch the active account on the transaction card between a credit card and debit card, respectively. In another example, if the transaction card is configured for a plurality of credit cards and/or debit cards, the user may issue a verbal command specific to a particular credit card or debit card. Another way in which an account number may be activated is by touching a specific area of the AR device or using a hand gesture that may indicate a specific credit card or debit card. As a further example, the user may activate an account number on the transaction card via an interface on a mobile device in communication with the transaction card. Other ways to activate an account for the transaction card are possible.

Once a particular transaction card account is activated, the transaction card may be used to purchase items. When the transaction card is scanned at a point of sale (POS) scanner, an account number for the activated transaction card is received during the POS scan. In embodiments in which the numberless transaction card stores information for multiple transaction card accounts, the account information for the transaction card account currently active on the numberless transaction card in provided to the POS.

Figure 1:
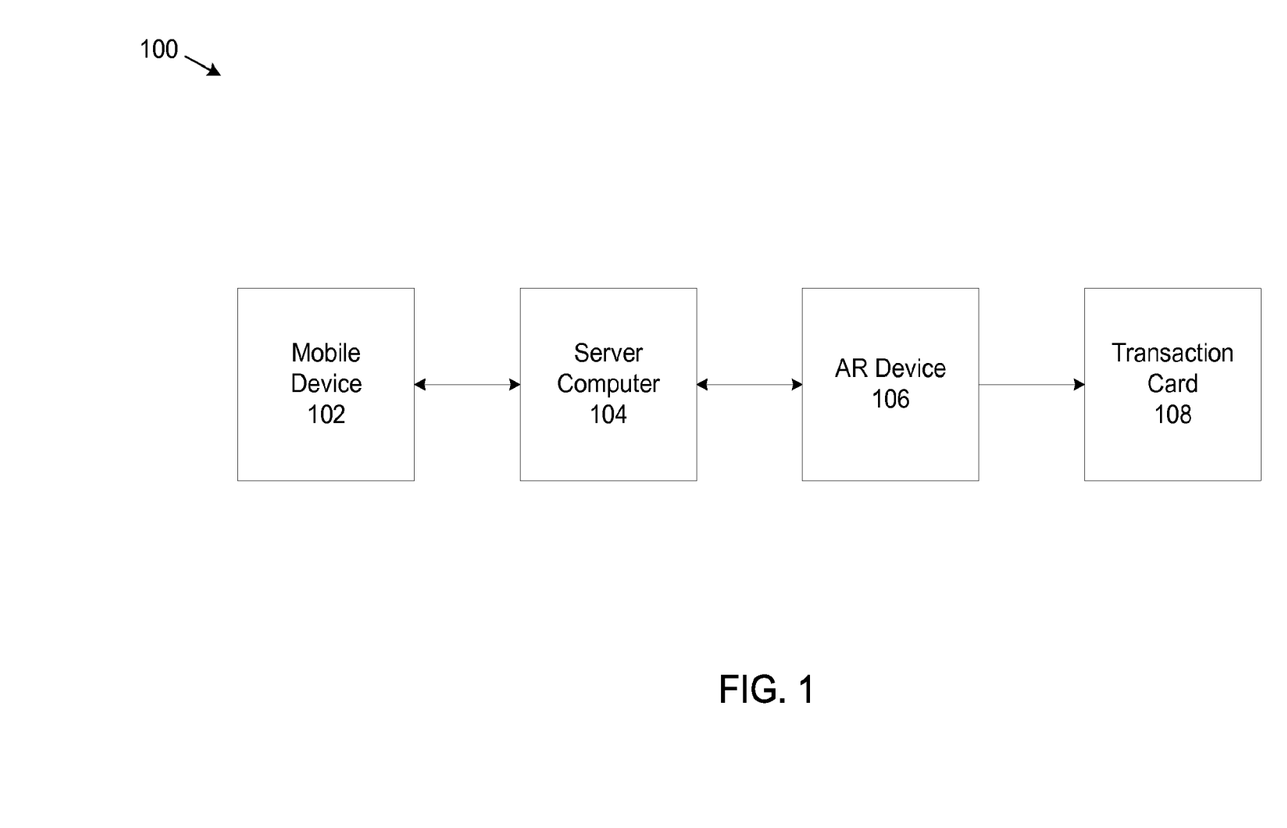
FIG. 1 shows an example system that may be used for an augmented reality (AR) numberless transaction card.

FIG. 1 shows an example system 100 that supports a numberless transaction card. The system 100 includes a mobile device 102, a server computer 104, an AR device 106 and a transaction card 108.

Mobile device 102 is typically either a smart telephone or a tablet computer having a financial software application. A wireless connection may be established between mobile device 102 and server computer 104. A user interface for the digital dashboard may be displayed on mobile device 102. Account information for the numberless transaction card may be entered via the digital dashboard, as explained in more detail later herein.

Typically, the digital dashboard is set up at the user's home. For example, mobile device 102 can be used at home to enter the account information via the digital dashboard. Other devices, for example a desktop computer, tablet computer, etc., can be used at home to set up the digital dashboard. When the digital dashboard is set up at home, the account information can simply be selected via AR device 106 when the numberless transaction card is being used.

Server computer 104 can be a server computer associated with a financial institution, such as a bank. AR device 106 may be an AR headset or a smart telephone or tablet computer having a processor, display, camera and AR software application. Transaction card 108 is a numberless transaction card in which account information is only visible to a user through an authorized AR device.

Figure 2:
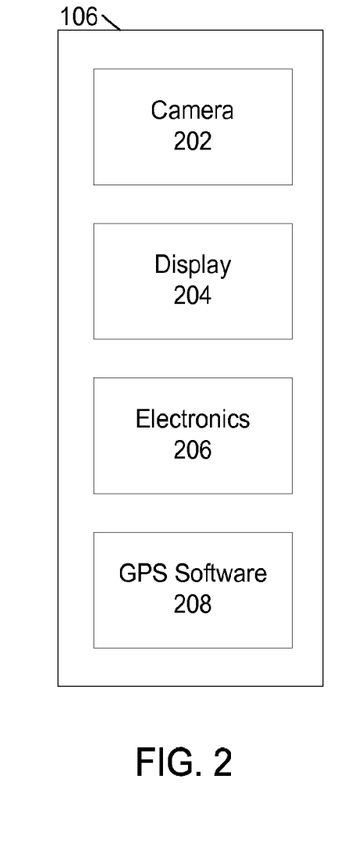
FIG. 2 shows example modules of the AR device of FIG. 1.

FIG. 2 shows example modules 200 of AR device 106. The example modules 200 include a camera 202, a display 204, electronics 206 and GPS software 208. The camera 202 is a camera that is built-in to AR device 106. Display 204 is a display that is also built-in to AR device 106. Electronics 206 includes an electronic computing device with wireless capability. The wireless capability may include Bluetooth, radio frequency identification (RFID) or similar types of wireless capability. GPS software 208 is typically a software application that may be installed on the mobile electronic device. When AR device 106 is an AR headset, camera 202, display, 204, electronics 206 and GPS software 208 are part of the AR headset.

Figure 3:
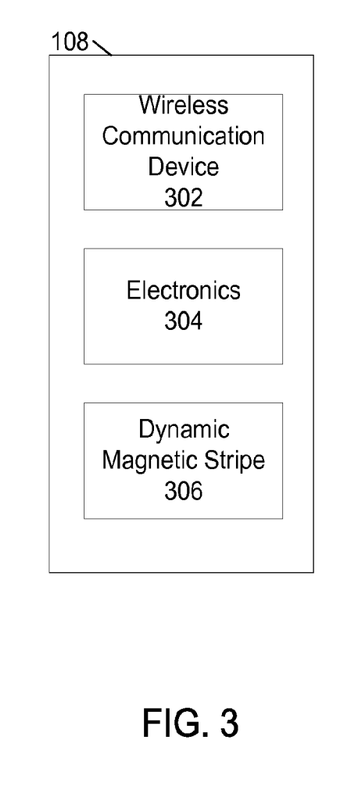
FIG. 3 shows example components of the transaction card of FIG. 1.

FIG. 3 shows example components of the transaction card 108. In some embodiments, the transaction card 108 includes a wireless communication device 302, electronics 304 and a dynamic magnetic stripe 306. The example wireless communication device 302 provides wireless communication with the AR device 106. In an example implementation, the wireless communication device 302 is a passive radio frequency identification (RFID) device. In other embodiments, the wireless communication device 302 is a Bluetooth enabled device, a WiFi enabled device, a cellular communications enabled device, or other short or long wireless communication device.

In some embodiments, the wireless communication device 302 is powered by a battery (not shown) that is integrated with the transaction card 108. In other embodiments, the wireless communication device 302 derives power from the AR device 106 when the wireless communication device 302 is in close proximity to the AR device 106 or other devices. The AR device 106 includes functionality for communication with the wireless communication device. For example, in one implementation, the transaction card 108 includes an RFID tag and AR device 106 includes an RFID reader.

In this example implementation, when a particular payment account is selected on AR device 106, for example via a verbal command, gesture or other selection mechanism associated with the transaction card, AR device 106 sends identifying information for the selected payment account to wireless communication device 302. The identifying information is in the form of a signal sent from AR device 106 to wireless communication device 302. The signal includes the identifying information. In an example implementation, the signal may use a form of load modulation or inductive coupling to transmit the identifying information. Other ways for the signal to include the identifying information are possible. In some implementations, the transaction card 108 may include a power source such as a battery.

Alternatively, transaction card 108 can be configured to store account information for one or more transaction card accounts. For example, transaction card 108 can include a memory (not shown) to store transaction card account and other information, such as identification information. The user can switch the transaction card account active on transaction card 108 using a verbal command, gesture, or other selection mechanism on AR device 106 as discussed above. In this embodiment, the signal sent from AR device 106 only identifies the identity of the transaction card account to be selected without transmitting account information to transaction card 108.

The electronics 304 can include a semiconductor device, for example a smart chip, that is embedded in or attached to the transaction card. The electronics 304 extracts the identifying information from the signal sent to wireless communication device 302. In some embodiments using a dynamic magnetic stripe, based on the identification information, the electronics 304 polarizes the dynamic magnetic stripe 306 to the selected account.

The dynamic magnetic stripe 306 comprises a band of magnetic material located on the back of transaction card 108 and forming a rectangular stripe. The band of magnetic material can store data by polarizing tiny magnets in the magnetic material. In this implementation, the dynamic magnetic stripe 306 is polarized based on the identifying information in the signal from wireless communication device 302. When the dynamic magnetic stripe 306 is polarized based on the identifying information in the signal from wireless communication device 302, the dynamic magnetic stripe 306 stores information regarding the selected transaction card account. The information stored in the dynamic magnetic stripe 306 typically includes the account number, CVV and expiration date for the selected account. Other or different information pertaining to the selected account may be stored.

In other embodiments, the dynamic magnetic stripe 306 may not be used. Instead, alternative embodiments can use contactless smart card technology. With the contactless smart card technology, the identifying information may be stored in a memory device on the card or the identifying information may be stored in the smart chip or on another microchip contained within electronics 304.

In alternate embodiments, transaction card 108 includes a means for communicating the account information to a POS via near-field communication. For example, transaction card 108 can include a near-field communication transceiver that communicates with a near-field communications device at the POS to transmit information about the active transaction card account on the transaction card. In this embodiment, electronics 304 controls the information transmitted to the POS via the near-field communications device. When the transaction card 108 is programmed with the selected account information, the transaction card 108 may be used for transactions for the selected account. For example, the transaction card 108 may be used in a POS device for purchases and may be used in an automated teller machine (ATM) in a same manner as if the transaction card 108 were a conventional transaction card with the account number of the selected account embossed on the conventional transaction card.

Figure 4:
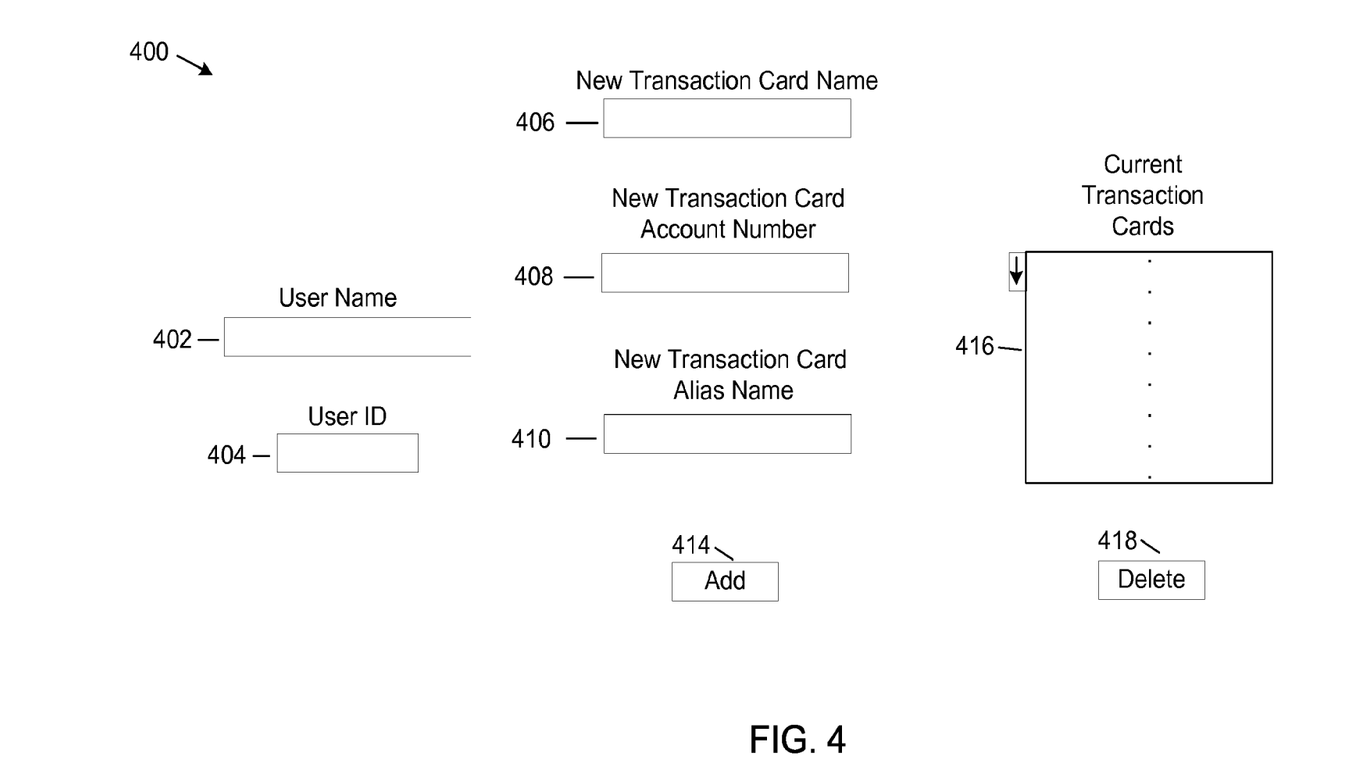
FIG. 4 shows an example user interface for a digital dashboard.

FIG. 4 shows an example user interface 400 for a digital dashboard. The user interface 400 may be displayed on mobile device 102 to permit the user to configure the transaction card 108 in advance of use. Alternatively, user interface 400 can be displayed on a home device, such as a home personal computer. The user interface 400 includes fields for a user name 402, user ID 404, new transaction card name 406, new transaction card account number 408, new transaction card nickname 410 and current transaction cards 416. Other fields are possible on the digital dashboard.

A user name and user ID are entered into the user name field 402 and the user ID field 404, respectively. The user ID may be a user account number for a financial institution such as a bank or some other unique identifier for the user.

When the user wants to add a new transaction card account to a list of accounts for the transaction card 108, a name for the transaction card account is entered via edit box 406 and an account number for the transaction card account is entered via edit box 408. A new transaction card nickname for the new transaction card account is optionally entered via edit box 410. The new transaction card nickname is a name that may be associated with an activating verbal command. For example if the new transaction card account name is a formal name for a credit card, the new transaction card nickname may be an alias for the credit card. When the new transaction card nickname field 410 is used, the activating verbal command may be the nickname rather than the formal name.

When the user enters a new transaction card account and clicks Add button 414, the new transaction card information is sent to server computer 104 and added to a list of available credit card accounts for transaction card 108. In addition, information regarding the new transaction card account is added to and displayed in the current transaction cards pull-down list box 416. The user may scroll the current transaction cards pull-down list box 416 to view transaction card information for all current transaction cards that may be activated for transaction card 108. As discussed, a transaction card account may be activated for transaction card 108 when the user issues a verbal command associated with the transaction card account.

A current transaction card may be deleted by selecting a transaction card from the current transaction cards pull-down list box 416 and then clicking Delete button 418.

In one alternative embodiment, the user can add a new transaction card account available for activation on transaction card 108 using AR device 106. For example, the user can capture an image of an actual transaction card with the camera of AR device 106. The captured image includes account information such as the user's name, account number, CVV and expiration date. AR device 106 can automatically extract the account information from the captured image to make the transaction card account available on transaction card 108.

Figure 5:
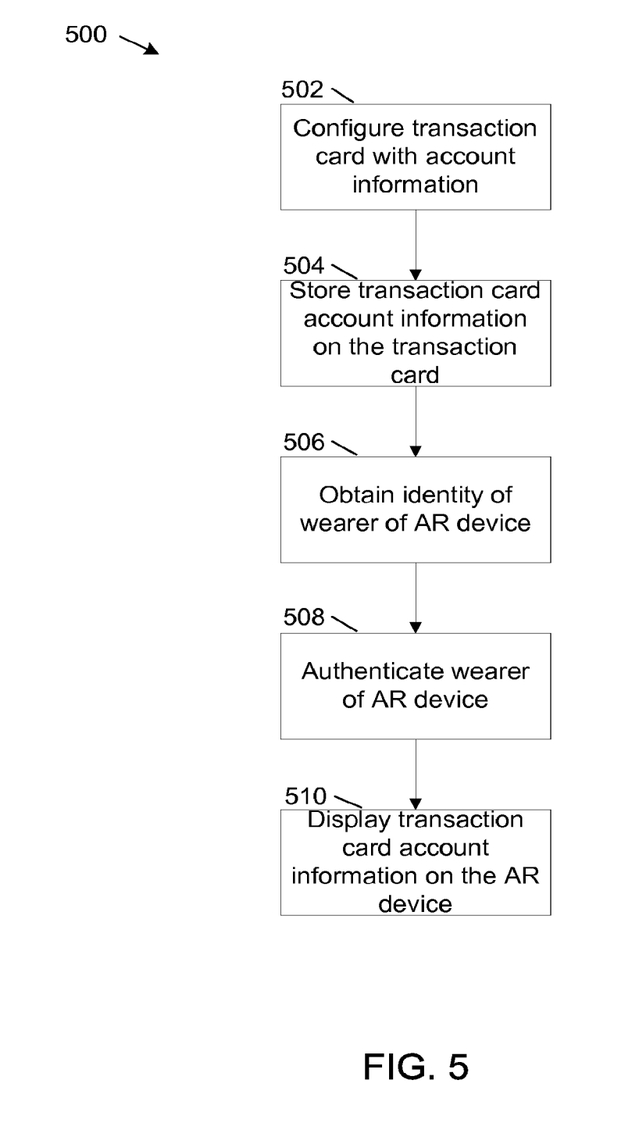
FIG. 5 shows a flowchart for an example method of configuring and using the transaction card of FIG. 1.

FIG. 5 shows a flowchart of a method 500 for configuring and using a numberless transaction card.

At operation 502, the transaction card is configured with account information. The account information comprises a name and account number associated with the transaction card. Account information for the transaction card account is available on a server computer, for example server computer 104, for a financial institution such as a bank.

The transaction card can be configured with the account information when the transaction card is issued to the user. The transaction card may also be configured with account information at other times—for example when previous account information on the transaction card has been compromised and new account information is to be configured and when an expiration date has expired.

At operation 504, the account information is stored on the transaction card and the transaction card is activated. In some embodiments, the account information is written to a dynamic magnetic stripe on the transaction card. In other embodiments, for example when the transaction card is a contactless card, the account information is written to a non-volatile memory device on the transaction card.

When the transaction card is activated, the transaction card may be used to make purchases using the transaction card account. The transaction card may be used in a similar manner to a standard transaction card which has a transaction card account number and other information embossed on the standard transaction card. For example, the activated transaction card may be used in a POS device when making purchases using the activated transaction card.

At operation 506, an identity of the wearer or user of the AR device is obtained. In some embodiments, the identity is obtained via a biometric authentication method such as facial recognition, retinal scan, voice print analysis or finger print scan. The AR device includes software that may be used to identify the wearer or user of the AR device from profile information, which can be stored on the AR device.

At operation 508, the wearer or user of the AR device is authenticated. Authentication comprises verifying that the identity of the wearer or user of the AR device corresponds to a person who is authorized to view transaction card account information on the AR device. The authentication prevents unauthorized individuals from viewing the transaction card account information associated with the numberless transaction card. In some implementations, the authentication may be implemented on the AR device. In other implementations, the authentication is implemented on a server computer, for example on server computer 104.

When the authentication is implemented on the server computer, identification information for the wearer or user of the AR device is sent from the AR device to the server computer. The server computer compares the identification with profile information that may be stored on the server computer or that is accessible from the server computer. The identification information that may be sent to the server computer is typically identification information derived from one of facial recognition, retinal scan, voice print analysis or finger print scan.

At operation 510, transaction card account information is displayed on the AR device. In some embodiments, the information is projected into space in front of the transaction card using a display mechanism on the AR device. The information typically includes an account name, an account number, an expiration date and a CVV code. Other or different information may be displayed. For example, an account balance and/or an amount of available credit for the transaction card account may be displayed. The information is displayed virtually so that only the wearer or user of the AR device is able to view the information. The information is not visible on the transaction card and the information is not visible to another user of an AR device that may view the transaction card or that may be looking over the shoulder of the wearer or user of the AR device on which the information is displayed.

Figure 6:
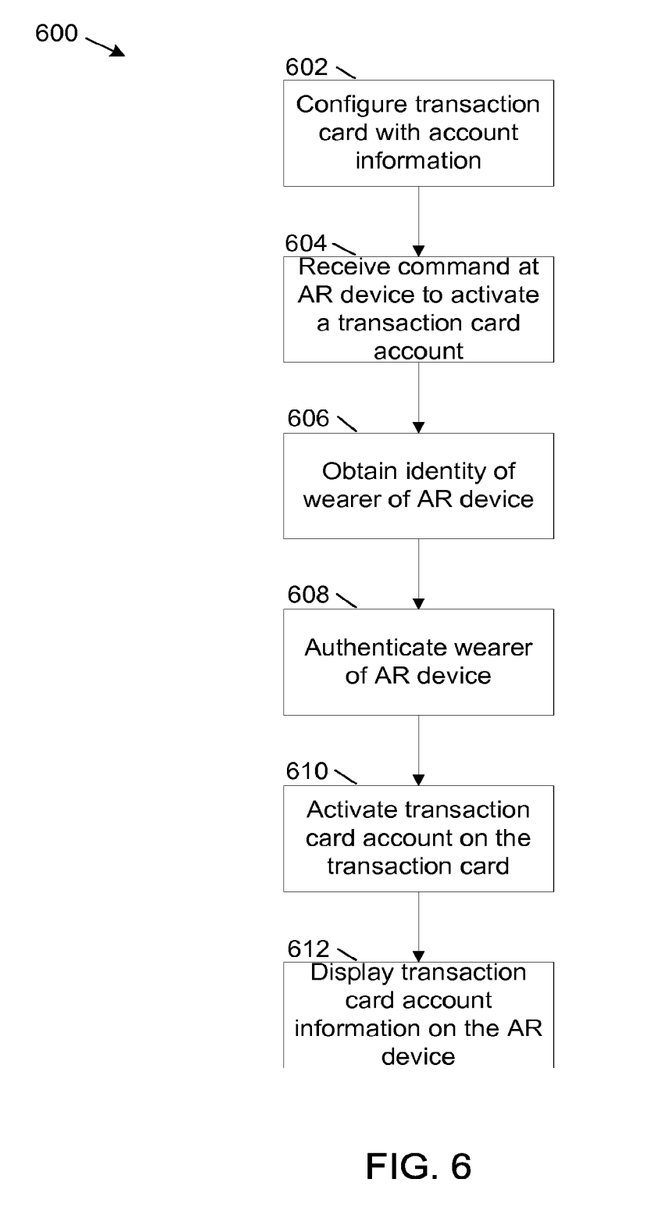
FIG. 6 shows another flowchart for an example method of configuring and using the transaction card of FIG. 1.

FIG. 6 shows a flowchart of a method 600 for configuring and using a numberless transaction card that stores a plurality of transaction card accounts.

At operation 602, the transaction card is configured with account information. The account information comprises names and account numbers for one or more transaction card accounts that may be activated for the transaction card. The transaction card accounts represent accounts that have already been opened and approved for a user. Account information for the transaction card accounts is available on a server computer, for example server computer 104, for a financial institution such as a bank.

In some embodiments, the transaction card is configured via a user interface of a digital dashboard, as described with regard to FIG. 4. The digital dashboard can be rendered on a mobile electronic device such as a smart telephone or a tablet computer or on a home device such as a personal computer. Configuring the transaction card using the digital dashboard comprises entering names and account numbers for each transaction card that may be used. In some embodiments, the names and account numbers are sent to the server computer. The server computer associates the names and account numbers with the transaction card. Alternatively, the names and account numbers are stored locally on the transaction card on AR device 106.

At operation 604, a command is received an AR device to activate a transaction card account. In some embodiments, the AR device, for example AR device 106, is a smart glass type of headset such as Google Glass. The command can be a verbal command issued by the wearer or user of the AR device, though other types of commands described above are also possible. The command identifies the transaction card account to be activated. The transaction card may be identified via a name of the transaction card, as entered into the digital dashboard, or via an alias for the credit card, as entered into the digital dashboard.

At operation 606, an identity of the wearer or user of the AR device is obtained. In some embodiments, the identity is obtained via a biometric authentication method such as facial recognition, retinal scan, voice print analysis or finger print scan. The AR device includes software that may be used to identify the wearer or user of the AR device from profile information, which can be stored on the AR device.

At operation 608, the wearer or user of the AR device is authenticated. Authentication comprises verifying that the identity of the wearer or user of the AR device corresponds to a person who is authorized to view transaction card account information on the AR device. The authentication prevents unauthorized individuals from viewing the transaction card account information associated with the numberless transaction card. In some implementations, the authentication may be implemented on the AR device. In other implementations, the authentication is implemented on a server computer, for example on server computer 104. When the authentication is implemented on the server computer, identification information for the wearer or user of the AR device is sent from the AR device to the server computer. The server computer compares the identification with profile information that may be stored on the server computer or that is accessible from the server computer. The identification information that may be sent to the server computer is typically identification information derived from one of facial recognition, retinal scan, voice print analysis or finger print scan.

At operation 610, after the wearer or user of the AR device is authenticated, a transaction card account associated with the command is activated on the transaction card. The activated account number (as well as CVV and expiration date) are then viewable by the user virtually on the transaction card through the AR device. The activation of the transaction card account comprises sending a signal from the AR device to the transaction card. The signal is sent via wireless communication to a wireless communication device on the transaction card. The signal includes information identifying the transaction card account to be activated. In some embodiments, the information is used to identify the transaction account to be activated on a dynamic magnetic stripe on the transaction card. The dynamic magnetic stripe stores account information for one or more transaction cards. In other embodiments, the information is used to control the signal transmitted from a near-field communications device on the payment card.

When the transaction card is activated, the transaction card may be used to make purchases using the transaction card account. The transaction card may be used in a similar manner to a standard transaction card which has a transaction card account number and other information embossed on the standard transaction card. For example, the activated transaction card may be used in a POS device when making purchases using the activated transaction card.

At operation 612, transaction card account information is displayed on the AR device. In some embodiments, the information is projected into space in front of the transaction card using a display mechanism on the AR device. The information typically includes an account name, an account number, an expiration date and a CVV code. Other or different information may be displayed. For example, an account balance and/or an amount of available credit for the transaction card account may be displayed. The information is displayed virtually so that only the wearer or user of the AR device is able to view the information. The information is not visible on the transaction card and the information is not visible to another user of an AR device that may view the transaction card or that may be looking over the shoulder of the wearer or user of the AR device on which the information is displayed.

Figure 7:
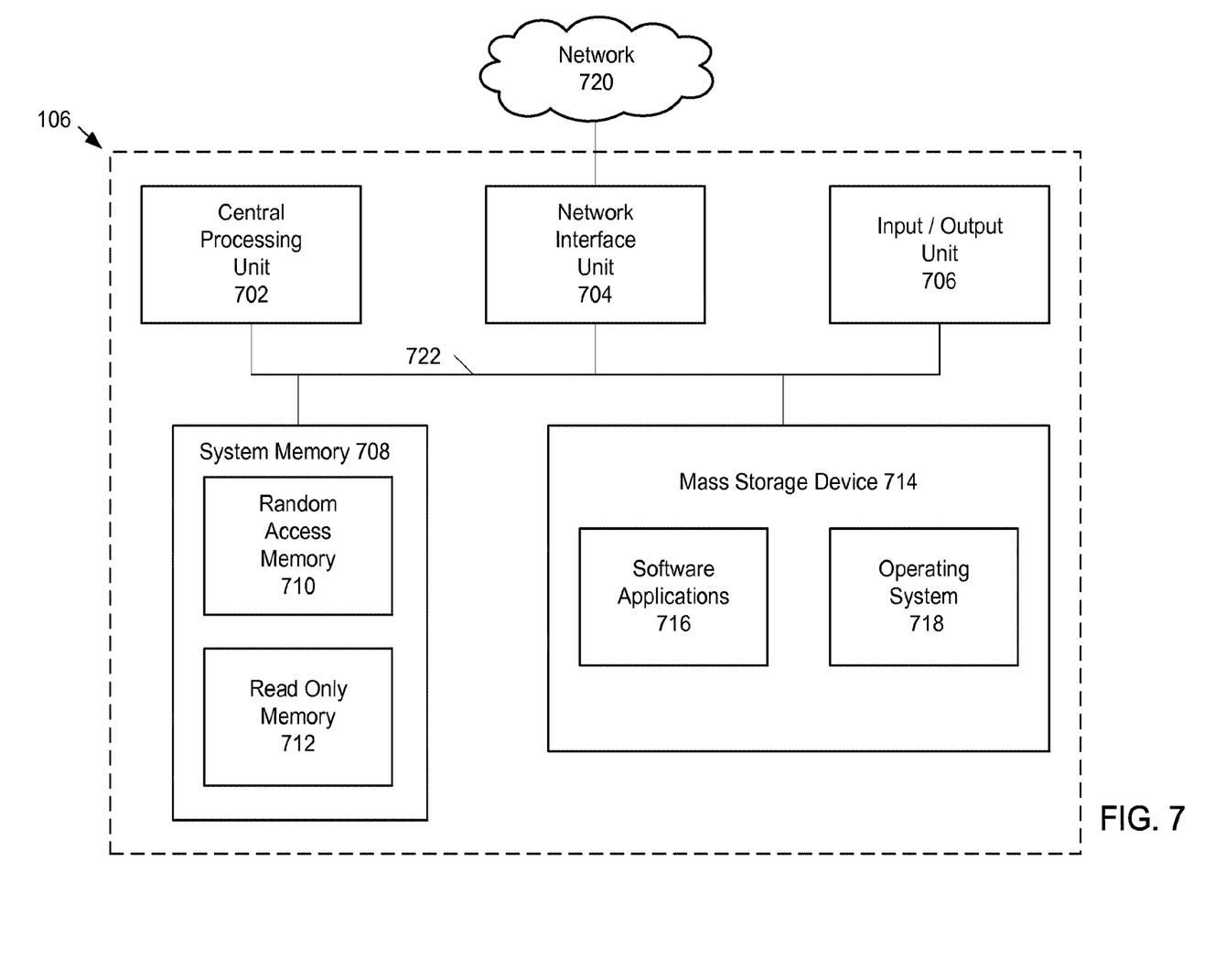
FIG. 7 shows example physical components of the AR device of FIG. 1.

As illustrated in the example of FIG. 7, the AR device 106 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the AR device 106, such as during startup, is stored in the ROM 712. The AR device 106 further includes a mass storage device 714. The mass storage device 714 is able to store software instructions and data. A central processing unit, system memory and mass storage device similar to that in FIG. 7 are also included in server computer 104.

The mass storage device 714 is connected to the CPU 702 through a mass storage controller (not shown) connected to the system bus 722. The mass storage device 714 and its associated computer-readable data storage media provide non-volatile, non-transitory storage for the AR device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 106.

According to various embodiments of the invention, the AR device 106 may operate in a networked environment using logical connections to remote network devices through the network 720, such as a wireless network, the Internet, or another type of network. The AR device 106 may connect to the network 720 through a network interface unit 704 connected to the system bus 722. It should be appreciated that the network interface unit 704 may also be utilized to connect to other types of networks and remote computing systems. The AR device 106 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the AR device 106 can store software instructions and data. The software instructions include an operating system 718 suitable for controlling the operation of the AR device 106. The mass storage device 714 and/or the RAM 710 also store software instructions, that when executed by the CPU 702, cause the AR device 106 to provide the functionality of the AR device 106 discussed in this document. For example, the mass storage device 714 and/or the RAM 710 can store software instructions that, when executed by the CPU 702, cause the AR device 106 to display received financial data on the display screen of the AR device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method, comprising:
providing a transaction card having an exterior that is free of account identifying information;
activating, with an electronic computing device, one of a plurality of transaction card accounts to provide an activated transaction card account; and
projecting, using the electronic computing device, the account identifying information of the activated transaction card account onto the transaction card,
wherein the electronic computing device includes an augmented reality device.

2. The method of claim 1, further comprising, prior to the activating, deactivating, with the electronic computing device, another of the plurality of transaction card accounts.

3. The method of claim 1, wherein the account identifying information includes any account numbers, any card verification value numbers, and any expiration dates.

4. The method of claim 1, wherein the account identifying information is only visible through the augmented reality device.

5. The method of claim 4, further comprising, prior to the activating, authenticating a user of the augmented reality device.

6. The method of claim 1, wherein the plurality of transaction card accounts are stored in a system memory of the transaction card.

7. The method of claim 1, wherein the transaction card includes an account information delivery element.

8. The method of claim 7, wherein the account information delivery element includes a dynamic magnetic stripe polarized based on the activated transaction card account.

9. The method of claim 1, wherein the transaction card includes a wireless communication device.

10. The method of claim 9, wherein the wireless communication device includes one of a passive radio frequency identification (RFID) device, a WiFi-enabled device, or a cellular communications enabled device.

11. The method of claim 10, wherein the wireless communication device is powered by a battery that is integrated with the transaction card.

12. The method of claim of claim 10, wherein the wireless communication device is powered by the electronic computing device.

13. The method of claim 12,
wherein the transaction card includes a RFID tag; and
wherein the electronic computing device includes a RFID reader configured to read the RFID tag.

14. An electronic computing device, comprising:
one or more processors; and
memory storing instructions which, when executed by the one or more processors, cause the electronic computing device to:
activate one of a plurality of transaction card accounts to provide an activated transaction card account; and
project account identifying information of the activated transaction card account onto a transaction card having an exterior that is free of the account identifying information,
wherein the electronic computing device includes an augmented reality device.

15. The electronic computing device of claim 14, wherein the account identifying information includes any account numbers, any card verification value numbers, and any expiration dates.

16. The electronic computing device of claim 14, wherein the electronic computing device powers a battery integrated with the transaction card.

17. The electronic computing device of claim 14,
wherein the transaction card includes a radio frequency identification (RFID) tag; and
wherein the electronic computing device includes a RFID reader configured to read the RFID tag.

18. The electronic computing device of claim 14, wherein the plurality of transaction card accounts are stored in a system memory of the transaction card.

* * * * *